3,264,265
PROCESS FOR PRODUCING FORMALDEHYDE POLYMERS FROM TRIOXANE AND THEIR STABILIZATION
Silvio Bezzi, Padova, Italy, assignor to Montecatini Societa Generale per l'Industria Mineraria e Chimica, a corporation of Italy
No Drawing. Filed Feb. 10, 1961, Ser. No. 88,273
Claims priority, application Italy, Feb. 24, 1960, 3,090/60
8 Claims. (Cl. 260—67)

This invention relates to the preparation, from anhydrous trioxane, of high molecular weight formaldehyde polymers having good thermal stability, mouldability and tenacity, and which are therefore employable as thermoplastic resins. The thermal stability of the product can be improved by variations in the terminal groups.

A number of formaldehyde polymers are known, varying greatly in chemical, physical and mechanical characteristics. Among them are paraformaldehyde or "trioxymethylene," the various polyoxymethylenes $\alpha$, $\beta$, $\gamma$, $\delta$, and the eu-polyoxymethylene of Staudinger.

The researches of Staudinger, Carothers and others made it possible to determine the structure of these linear macromolecular compounds, and to establish that their different thermal stability depends on the nature of the terminal groups, and also on the molecular weight of the polymers.

In the less stable products the terminal groups of the acetalic molecule are two semiacetalic hydroxyls, as in the polyoxymethylene-dihydrates (glycols) of Staudinger, the $\alpha$- and $\beta$-polyoxymethylenes, and paraformaldehyde. In the more stable products, the hydrogen atoms of the said hydroxyls are substituted by alkyl, as in the dimethylethers or $\gamma$-polyoxymethylenes, or by acyl radicals, as in the polymethylene-di-acetates of Staudinger.

The low molecular weight polyoxymethylene glycols, viz. paraformaldehyde, are thermally so unstable that they are usually employed for producing gaseous formaldehyde.

The polyoxymethylene glycols having a higher molecular weight, among them the eu-polyoxymethylenes of Staudinger, have much greater thermal stability. Their stability varies considerably, depending upon the method of production, viz. from anhydrous formaldehyde by mass polymerization, or by polymerization in solution, or in vapor phase, in the presence or absence of catalysts. Some are amorphous powders, others glasses or transparent films.

Notable among the formaldehyde polymers is $\epsilon$-polyoxymethylene. It is a white substance having a silky paper-like appearance, and is obtained from trioxane, a cyclic trimer of formaldehyde. Its thermal stability is considerably greater than that of the best products obtained by polymerizing monomeric formaldehyde.

For this reason Staudinger, in Ann. 474. 235 (1929), considers that $\epsilon$-polyoxymethylene has the structure of a $\delta$-polyoxymethylene, i.e. with methylated terminal groups. The preparation of $\epsilon$-polyoxymethylene according to the known process is a very slow operation. The known process requires several sublimations of trioxane contained in a flame-sealed glass pipe under vacuum.

It has now been found that anhydrous oxalic acid, preferably in concentrations between 0.1% and 1% (and even at higher and lower concentrations such as from 0.05 to 10%), but most advantageously at 0.1%, catalyzes the reaction. However, the reaction maintains its main characteristics, since the sublimation stage is indispensable in order for the transformation of trioxane into resin to take place.

The present invention provides a practical process for preparation of thermoplastic resins from trioxane, as will be evident from the examples reported hereinbelow.

The characterization of the products thus obtained was carried out by determining the reduced viscosity in dimethylformamide at 150° C.$\pm$0.1, at 0.5% concentration.

$$\eta_{\text{red}} = \frac{\eta_r - 1}{C} = \frac{\eta_{\text{sp}}}{C}$$

(where C is the concentration by weight).

Reference is made to the text by F. W. Billmeyer, "Textbook of Polymer Chemistry," published 1957, by Interscience, Chapter 14, "Solution Viscosity and Molecular Size," Table 14–1, page 128, for an explanation of the above terms. Reduced viscosity ($\eta_{\text{red}}$) means viscosity number. The term $\eta_r$ means relative viscosity or viscosity ratio. The term $\eta_{\text{sp}}$ means specific viscosity.

The thermal stability was determined by moulding tests, and also by measuring the weight loss which takes place when 0.5 gram of product are heated successively several times, each time for 4 minutes, to 215° C. The average percent loss per minute is herein called "thermal degradation."

The modification of the terminal groups in order to increase the thermal stability of the products was carried out by two methods:

(a) Acetylation of the terminal semiacetalic hydroxyls and of the alcoholic hydroxyls (if any) in the interior of the chain ($\delta$-polyoxymethylenes) by the method described by Staudinger and collaborators, Ann. 474, 155, 275 (1929). According to that method, the products to be acetylated are heated to high temperatures (up to 170° C.) with an excess of acetic anhydride for a half hour or more, while adjusting the temperature and the reaction time according to the finding of Staudinger (ibid. pages 174–175) so that the degradation which accompanies the acetylation increases with increasing temperature and reaction time.

Since the degradation is greater for the products having a higher degree of polymerization, it is possible to render the products more homogeneous, and to obtain them with the fluidity desired in the moulding stage.

(b) (Esterification of the aforementioned hydroxyls with $\beta$-oxycrotonic acid by heating $\epsilon$-polyoxymethylenes with the dimer of ketene (lactone of $\beta$-oxycrotonic acid), preferably using 10% by weight of the ketene dimer and heating to 130° C. for half an hour. This reaction, on which the invention is also based, is catalyzed by tertiary amines.

Example 1 describes the preparation of polyoxymethylenes according to the known method. Examples 2 to 7 describe preparation by the present invention.

*Example 1*

25 g. of anhydrous trioxane are introduced into a glass vial, which is sealed under vacuum and kept completely immersed in heated water at 70° to 80° C. for 15 days. No formation of resin takes place and the trioxane remains unaltered. The temperature of the water is lowered to 60°–70° C. and two-thirds of the vial are kept out of the bath so as to allow the sublimation of trioxane in the cold part of the vial. In the course of 6 days the vial is turned over 20 times. A progressive increase in the formation of resin suspended in the molten trioxane or sticking to the walls is observed. The vial is then opened, its content is treated with warm water to remove the trioxane and is then washed with water and dried in a vacuum oven at 50° C. 5g. (yield 20%) of $\epsilon$-polyoxymethylene, having a fibrous aspect, are obtained. Reduced viscosity=1.8; thermal degradation at 215° C.=0.3%; melting point= 180–185° C. (observed with the microscope). Upon moulding at 180° C. under a pressure of 25 kg./cm.$^2$ a slight odor of formaldehyde is noted without any manifest decomposition of the product. A lamina is obtained hav-

Example 2

10 g. of anhydrous trioxane and 0.01 g. of oxalic acid (0.1%) were closed under vacuum in a 100-ml. vial which was then kept immersed in water at 70°–80° C. for 10 days. No resin formation was observed. The temperature was lowered to 60°–70° C. and two-thirds of the vial were raised from water so as to allow the sublimation of trioxane on the cold part. The vial was broken open and its content was treated with warm water to remove the trioxane, the residue was washed with water and vacuum dried at 50° C. 2.5 g. (yield 25%) of ε-polyoxymethylene were obtained. Reduced viscosity= 1.7; thermal degradation 0.5%; melting point: 178–182° C.

Example 3

10 g. of trioxane and 0.005 g. of hydrated oxalic acid (0.05%) were placed in a vial which was then sealed under nitrogen. During 24 hours five sublimations were carried out under the conditions described in Example 1. After washing with warm water and vacuum drying, 8 g. of polymer (yield 80%) were obtained. Reduced viscosity=0.6; thermal degradation at 215° C.=1%; melting point 170°–175° C. The low reduced viscosity is attributable to the water of crystallization of the oxalic acid, which supplies the terminal hydroxyls to molecules having a comparatively low molecular weight.

Example 4

25 g. of anhydrous trioxane and 0.25 g. of oxalic acid (1%) are closed in a 150-ml. vial under vacuum. The vial is immersed to one-half its length in water at 60° C. and the upper part is cooled by circulation of water at 18° C. During 5 hours the product is subjected to many sublimations, by turning the vial over many times during the five hours. The contents of the vial are transferred to a distillation apparatus provided with a reflux condenser kept at 65° C. and with a collecting flask at 0° C. The flask containing the reaction product is heated to 100° C. and the unaltered trioxane is distilled under moderate vacuum: 2.6 g. of trioxane (10%) are recovered. The residue is washed with warm water and is vacuum dried. 21 g. of ε-polyoxymethylene are obtained. Conversion yield 84%, reaction yield 94%; reduced viscosity 1.1; thermal degradation 1.3%; melting point 173–175° C.

Example 5

25 g. of anhydrous trioxane and 0.025 g. of oxalic acid (0.1%) are closed in a 150-ml. vial under vacuum. A number of sublimations are carried out during 24 hours under the conditions described in Example 4. 5 g. of trioxane (20%) are recovered upon distillation. After washing and vacuum drying, 19 g. of ε-polyoxymethylene are obtained. Conversion yield 76%; reaction yield 95%; reduced viscosity 3.4; thermal degradation 0.5%; melting point 176–177° C.

Example 6

50 g. of anhydrous trioxane and 0.05 g. of oxalic acid (0.1%) are enclosed in a 300-ml. vial under vacuum. Two sublimations are then carried out in 4 hours under the conditions described in Example 4. 18.5 g. (37%) of trioxane are recovered by distillation and, after washing and vacuum drying, 31 g. of ε-polyoxymethylene are obtained. Conversion yield 62%; reaction yield 98%; reduced viscosity 1.7; thermal degradation 0.5%; melting point 178–180° C.

Example 7

50 g. of anhydrous trioxane and 0.5 g. of oxalic acid (0.1%) are enclosed in a 500-ml. vial under vacuum. Under the conditions described in Example 4, four sublimations are carried out in 8 hours. 13 g. of trioxane (26%) are recovered by distillation and, after washing and vacuum drying, 36.5 g. of ε-polyoxymethylene are recovered. Conversion yield 73%; reaction yield 96%; reduced viscosity 1.5; thermal degradation 1.5%; melting point 175°–177° C.

All the products of Examples 1 to 7 present substantially the same moulding behavior as that of Example 1 and have a considerably higher aldehyde odor, but no decomposition can be observed.

Their thermal behavior can be improved substantially by subjecting them to a stabilization treatment as illustrated in the following further examples:

(a) Examples 8 and 9 describe stabilization of polyoxymethylenes by acetylation with acetic anhydride.

Example 8

5 g. of a polymer prepared as described in Example 3, and 50 g. of acetic anhydride are heated to 165°–170° C. in a vacuum sealed vial. A great part of the polymer is dissolved within 5–10 minutes and the remaining portion is transformed into a transparent gel. The temperature is allowed to drop to 160° C. and, after a half hour, the vial is slowly cooled to room temperature. At about 130° C. the transparent gel becomes opaque, and the product begins to separate from the solution. The polyoxymethylene acetates thus separated are filtered, washed abundantly with a little acetic acid and then with water until the washing water is neutral, suspended in distilled water and kept in agitation for 24 hours. They are then filtered again and vacuum dried at low temperature. 5 g. of a polymer which has substantially the same reduced viscosity and melting point as the non-treated product, but has a higher thermal stability, are obtained; the thermal degradation in fact decreases from 1% to 0.06%.

Example 9

Three vials, each containing 5 g. of the polymer prepared as described in Example 3 and 2.5 ml. of acetic anhydride, are heated to 130° C. for half an hour, 1 hour and 2 hours, respectively. The yields of acetylated product, purified as described in Example 8, are 96%, 90% and 90%. The thermal degradation (amounting to 1.3% for the original polymer) is now 0.7%, 0.5% and 0.5%, respectively.

(b) Examples 10, 11, 12 describe stabilization of polyoxymethylenes by esterification with the lactone of β-oxycrotonic or isocrotonic acid (ketene dimer) according to the present invention.

Example 10

5 g. of ε-polyoxymethylene, prepared as described in Example 4, and 0.5 g. of the ketene dimer in a vacuum-sealed vial are heated to 60° C. for 24 hours. The polymer is digested with acetone for 24 hours, washed with the same solvent and vacuum dried. 5 g. of a product whose thermal degradation is 0.4% are obtained.

Example 11

5 g. of ε-polyoxymethylene, prepared as described in Example 4, 0.5 g. of ketene dimer and 0.1 g. of pyridine in a vacuum-sealed vial are heated to 60° C. for 24 hours. The polymer is digested with acetone, washed with the same solvent and vacuum dried. 5 g. of product presenting a thermal degradation of 0.2% are obtained. The improvement over Example 10 is to be ascribed to pyridine. In a similar way act other tertiary amines, e.g., trimethylamine.

Example 12

Two vials containing 5 g. of ε-polyoxymethylene, prepared as described in Example 3, and 0.5 g. of ketene dimer are heated to 130° C. for a half hour, and 1 hour, respectively. The products are then digested with acetone and washed with the same solvent. The products when vacuum dried have a thermal degradation of 0.6% and 0.2%, respectively. With the half-hour treatment the yield of stabilized polymer is 100%, while with the 1-hour treatment it is 96%. All the products of Examples 10 to 12, when moulded, have no aldehyde odor.

It is to be understood that the type of sublimation procedure and equipment described above can be replaced by procedures disclosed in the prior patents and literature for large-scale production of these higher polymers of formaldehyde.

I claim:

1. A process for converting trioxane into a thermoplastic resin, comprising subliming anhydrous trioxane under vacuum in the presence of oxalic acid.

2. A process of converting trioxane into a thermoplastic higher polymer of formaldehyde, comprising subliming anhydrous trioxane under vacuum in the presence of about 0.05 to 10 percent of oxalic acid.

3. A process for converting trioxane into a higher polymer of formaldehyde, said polymer comprising epsilon-polyoxymethylenes, the process comprising heating trioxane in a reaction vessel enclosed under vacuum, the lower part of which is heated to about 60°–70° C., subliming trioxane in the upper part of the reaction vessel, the heating being in the presence of about 0.05 to 10 percent of oxalic acid, the sublimation being repeated a plurality of times, by overturning the reaction vessel.

4. A process for converting trioxane into a higher polymer of formaldehyde, said polymer comprising epsilon-polyoxymethylenes, the process comprising heating trioxane in a reaction vessel enclosed under vacuum, the lower part of which vessel is heated to about 60°–70° C., subliming trioxane in the upper part of the reaction vessel, the heating being in the presence of about 0.05 to 1 percent of oxalic acid.

5. A process for converting trioxane into a higher polymer of formaldehyde, comprising subliming trioxane under vacuum in the presence of oxalic acid, the oxalic acid being from about 0.05 to 1 percent by weight of the trioxane.

6. A process for converting trioxane into a higher polymer of formaldehyde, comprising repeatedly subliming trioxane in the presence of oxalic acid, in an evacuated sealed reaction vessel, the oxalic acid being about 1 percent by weight of the trioxane.

7. A process of stabilizing a higher polymer of formaldehyde, comprising epsilon-polyoxymethylenes, said process comprising heating the polymer with the lactone of β-oxycrotonic acid.

8. A process of stabilizing a higher polymer of formaldehyde, comprising epsilon-polyoxymethylenes, said process comprising heating the polymer with the lactone of β-oxycrotonic acid.

References Cited by the Examiner

UNITED STATES PATENTS

| | | | |
|---|---|---|---|
| 2,296,249 | 9/1942 | Austin et al. | 260—67 |
| 2,369,504 | 2/1945 | Walker | 260—615.5 |
| 2,795,571 | 6/1957 | Schneider | 260—67 |
| 2,998,409 | 8/1961 | Nogare et al. | 260—67 |
| 3,022,342 | 2/1962 | Fernholz et al. | 260—67 |
| 3,026,299 | 3/1962 | Kray et al. | 260—67 |
| 3,046,251 | 7/1962 | Wagner | 260—67 |

OTHER REFERENCES

Derwent Belgian Patent Report, No. 61A, Jan. 31, 1960, p. A11.

Kohlschutter et al.: Z. Phys. Chem. Abt. (Leipzig), B16, pages 284–302 (1932). QD145 English Translation.

Walker et al.: Industrial and Engineering Chemistry, vol. 39, August 1947, pp. 974–977. TP1.A58.

Walker: Formaldehyde, ACS Mono. 120 (1953), pp. 152–3.

WILLIAM H. SHORT, *Primary Examiner.*

LOUISE P. QUAST, MILTON STERMAN, *Examiners.*

L. M. MILLER, R. J. BUTTERMARK, H. D. ANDERSON, *Assistant Examiners.*